US009213215B2

United States Patent
Shaw et al.

(10) Patent No.: US 9,213,215 B2
(45) Date of Patent: Dec. 15, 2015

(54) IR FIBER BROADBAND MID-IR LIGHT SOURCE

(71) Applicants: Leslie Brandon Shaw, Woodbridge, VA (US); Rafael R. Gattass, Washington, DC (US); Jasbinder S. Sanghera, Ashburn, VA (US); Ishwar D. Aggarwal, Charlotte, NC (US)

(72) Inventors: Leslie Brandon Shaw, Woodbridge, VA (US); Rafael R. Gattass, Washington, DC (US); Jasbinder S. Sanghera, Ashburn, VA (US); Ishwar D. Aggarwal, Charlotte, NC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 370 days.

(21) Appl. No.: 13/742,563

(22) Filed: Jan. 16, 2013

(65) Prior Publication Data
US 2013/0188240 A1   Jul. 25, 2013

Related U.S. Application Data

(60) Provisional application No. 61/588,202, filed on Jan. 19, 2012.

(51) Int. Cl.
G02B 6/00 (2006.01)
G02F 1/35 (2006.01)
G02F 1/365 (2006.01)

(52) U.S. Cl.
CPC .............. *G02F 1/3532* (2013.01); *G02F 1/365* (2013.01); *G02F 2001/3528* (2013.01)

(58) Field of Classification Search
None
See application file for complete search history.

(56) References Cited

U.S. PATENT DOCUMENTS

| | | | |
|---|---|---|---|
| 7,133,590 B2 | 11/2006 | Shaw et al. | |
| 7,519,253 B2 | 4/2009 | Islam | |
| 8,055,108 B2 * | 11/2011 | Islam | 385/122 |
| 2006/0002437 A1 * | 1/2006 | Braun et al. | 372/22 |
| 2006/0153254 A1 * | 7/2006 | Franjic et al. | 372/30 |
| 2006/0210227 A1 * | 9/2006 | Shaw et al. | 385/122 |
| 2010/0108886 A1 * | 5/2010 | Shaw et al. | 250/339.08 |
| 2012/0027031 A1 * | 2/2012 | Liu | 372/6 |
| 2013/0188660 A1 | 7/2013 | Shaw et al. | |
| 2014/0010497 A1 * | 1/2014 | Kelly et al. | 385/28 |

* cited by examiner

*Primary Examiner* — Sung Pak
(74) *Attorney, Agent, or Firm* — US Naval Research Laboratory; Rebecca L. Forman

(57) ABSTRACT

A method of generating a supercontinuum in chalcogenide fiber with a pump light comprising a short pulse fiber laser or diode laser operating with a wavelength of 1.0 μm or greater that is wavelength shifted through a nonlinear fiber one or more times and amplified one or more times and launched into a chalcogenide fiber whereby the spectrum is broadened in the chalcogenide fiber through various nonlinear processes to generate a supercontinuum within the mid-IR from 1.5 to greater than 5 μm.

20 Claims, 2 Drawing Sheets

IR FIBER BROADBAND MID-IR LIGHT SOURCE

PRIORITY CLAIM

This Application claims priority from U.S. Provisional Application No. 61/588,202 filed on Jan. 19, 2012 by Leslie Brandon Shaw et al., entitled "IR FIBER BROADBAND MID-IR SOURCE," the entire contents of which are incorporated herein by reference.

CROSS REFERENCE

Cross reference is made to copending application Ser. No. 13/742,566, filed contemporaneously herewith, entitled "SHORT PULSED IR FIBER LASER AT WAVELENGTH >2 μm," by Leslie Brandon Shaw et al., the entire contents of which are incorporated herein by reference.

BACKGROUND OF THE INVENTION

1. Field of the Invention

The present invention relates generally to broadband light sources and, more specifically, to generating supercontinuum in a chalcogenide fiber.

2. Description of the Prior Art

Supercontinuum generation is the process whereby one or more pump sources passing through a medium generates broadband light through a number of nonlinear processes such as modulation instability, four wave mixing, self phase modulation and Raman shifting. Typically, the light generated has a bandwidth many times greater than the bandwidth of the input pump source or sources.

Chalcogenide fiber is fiber composed of the chalcogen elements, sulfur, selenium, and tellurium. Typically, other elements are added to stabilize the glass. Arsenic sulfide ($As_2S_3$), arsenic selenide ($As_2Se_3$), germanium arsenic sulfide, and germanium arsenic selenide are examples of chalcogenide glass.

Optical fiber consists of a core surrounded by one or more claddings. Light travels in the core and is confined by the index difference between the core and cladding. Microstructured fiber or photonic crystal fiber is a fiber whereby the cladding or claddings comprise a geometric arrangement of air holes in the cladding glass U.S. Pat. No. 7,133,590 to Shaw teaches a method of generating supercontinuum in a chalcogenide fiber, either conventional core/clad fiber of microstructured photonic crystal fiber within the range of 2 to 14 μm by launching pump light into a chalcogenide fiber whereby the input pump light is broadened by several nonlinear mechanisms in said fibers. However, the method of Shaw is low power, cannot accommodate all fiber, requires large fs Ti:sapphire/OPA for pumping, and pumps in the anomalous dispersion region of fiber. U.S. Pat. No. 7,519,253 to Islam teaches a system and method to generate a broadband supercontinuum in either chalcogenide, fluoride, or tellurite fiber with a pump light consisting of a short pulse laser diode with wavelength of shorter than 2.5 μm and pulse width of at least 100 ps with one or more optical amplifiers chains and a nonlinear fiber with anomalous dispersion at the diode wavelength that modulates the diode through modulation instability. However, the method of Islam requires an initial seed pulse duration of greater than 100 ps and pumps in the anomalous dispersion region of fiber.

What is needed but not present in the prior art is a method of generating supercontinuum in a chalcogenide fiber with a pump light comprising a short pulse fiber laser or diode laser that is wavelength shifted, amplified, and launched into a chalcogenide fiber to generate a broadband spectrum within the mid-IR from a wavelength of 1.5 μm to greater than 5 μm.

BRIEF SUMMARY OF THE INVENTION

The present invention provides a method of generating a supercontinuum in chalcogenide fiber with a pump light comprising a short pulse fiber laser or diode laser operating with a wavelength of 1.5 μm or greater that is wavelength shifted through a nonlinear fiber one or more times and amplified one or more times and launched into a chalcogenide fiber whereby the spectrum is broadened in the chalcogenide fiber through various nonlinear processes to generate a supercontinuum within the mid-IR from 1.5 to greater than 5 μm.

The method of the present invention has several advantages. It provides broad wavelength coverage in the mid-IR (from 1.5 to greater than 5 μm). The present invention is power scalable. It enables an all fiber based broadband mid-IR fiber source that is compact, rugged, and highly efficient. Moreover, the present invention does not require a specially structured fiber. This invention has applications in spectroscopy, chemical sensing, sensor testing, remote sensing, IR countermeasures, LIDAR, IRCM, laser surgery, and free space communications.

The present invention has several advantages over other demonstrated mid-IR supercontinuum sources. Sources have been demonstrated in fluoride fiber; however, they have only been able to reach ~4.3 μm using all fiber pumping. Sources have reached beyond 5 μm using a short length of fluoride fiber and large bulky Ti:Sapphire based OPA pumps; however, these systems are not compact and the average power was typically very low (<50 mW). The present invention is scalable to multi-watt power in a small compact all fiber package.

These and other features and advantages of the invention, as well as the invention itself, will become better understood by reference to the following detailed description, appended claims, and accompanying drawings.

DETAILED DESCRIPTION OF THE INVENTION

The present invention is a method to generate broadband supercontinuum in the mid-IR from 1.5 to greater than 5 μm. This method is an all-fiber format employing a short pulsed fiber pump laser pumping an IR transmitting chalcogenide fiber. In a preferred embodiment, the chalcogenide fiber is based on $As_2S_3$ or $As_2Se_3$. While previous attempts to produce broadband supercontinuum in chalcogenide fiber use exotic photonic crystal fiber structures, the present method uses conventional step index fiber structures.

Typically supercontinuum is generated by pumping in or near the anomalous dispersion region ($dn/d\lambda > 0$) of the fiber. The mechanism is primarily through four-wave-mixing (FWM) and solition dynamics. However, the present invention generates supercontinuum by pumping entirely in the normal dispersion region ($dn/d\lambda < 0$) of the fiber. The supercontinuum is in the normal dispersion region, and the primary mechanisms are stimulated Raman scattering and self phase modulation.

A seed light comprising a short pulse (1 ns or less) diode laser or fiber laser in the near IR from 1 to 2 μm wavelength is wavelength shifted in one or more nonlinear fibers one or more times and amplified one or more times to a wavelength of greater than 2.4 μm and used to pump a chalcogenide fiber comprising either a solid core/clad fiber or microstructured fiber where the dispersion of the chalcogenide fiber can be normal, zero, or anomalous at the pump wavelength of 2.4 μm or greater to generate a supercontinuum in the IR within the range of 1 to 14 μm. The nonlinear fiber can comprise silica, fluoride, tellurite, germinate, phosphate, or chalcogenide glass. The amplifiers can be fiber amplifiers, semiconductor optical amplifiers, or bulk nonlinear crystal optical parametric amplifiers.

In one embodiment of the present invention, the generated light of 2.4 μm or greater described above is also amplified by either a fiber amplifier or semiconductor amplifier and then launched into a chalcogenide fiber to generate broadband supercontinuum. The chalcogenide fiber can be a step index, graded index, or microstructured fiber.

In another embodiment, the broadband spectrum from the chalcogenide fiber amplifier is amplified and injected into another chalcogenide fiber to generate a longer wavelength broadband spectrum. The amplifier can be a chalcogenide fiber Raman or a rare earth doped amplifier, a semiconductor optical amplifier or a bulk nonlinear crystal optical parametric amplifier.

Figure 1:
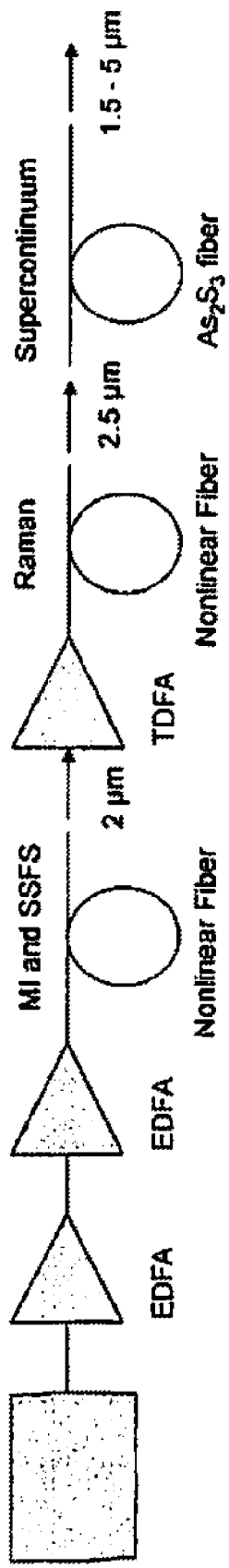
FIG. 1 is a schematic drawing of the mid-IR supercontinuum source.
Figure 2:
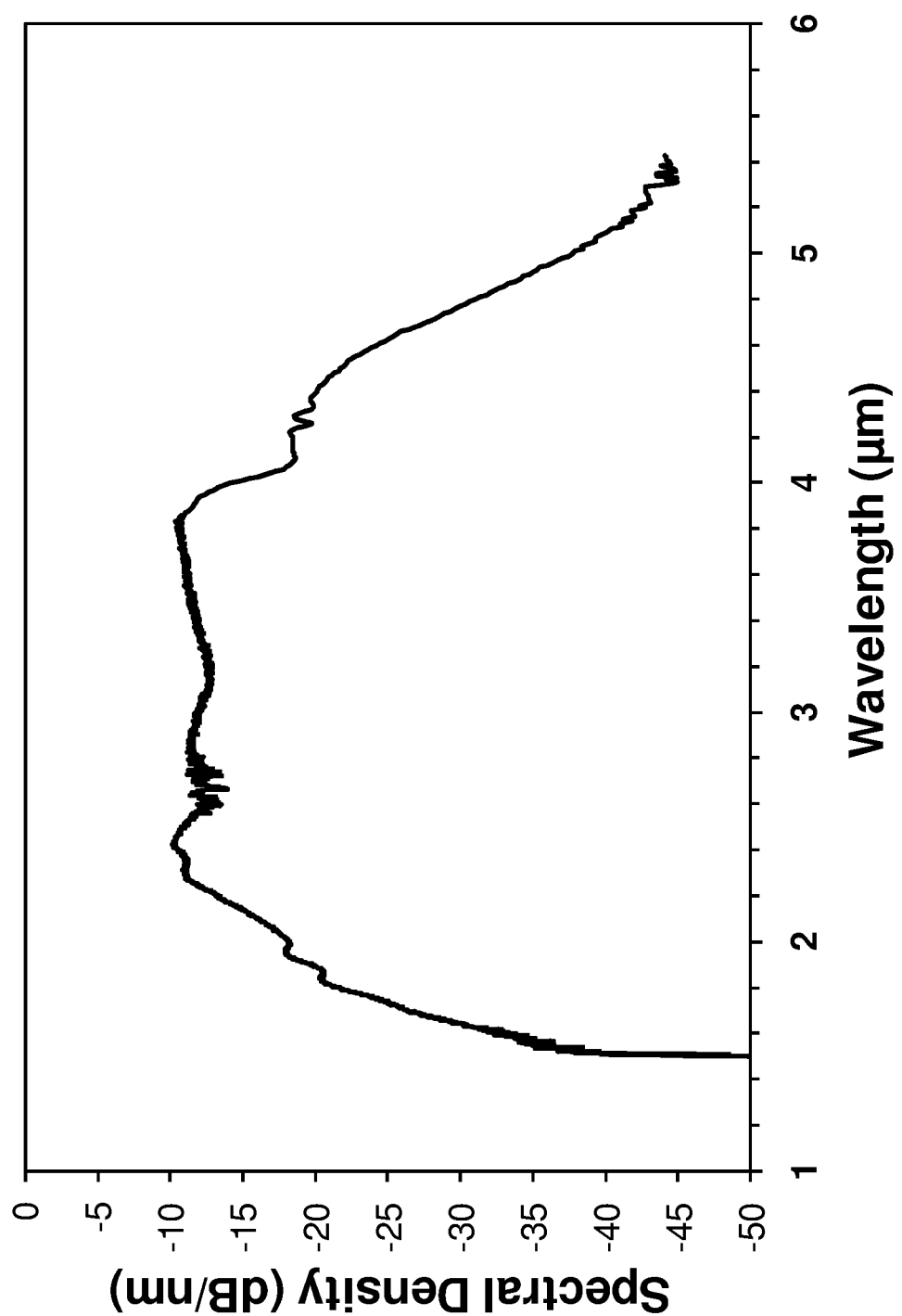
FIG. 2 is a plot of the output of the mid-IR supercontinuum source.

According to one demonstration of the present invention, a short pulse mode locked fiber laser operating at 1.5 μm with pulse width of 80 ps and repetition rate of 500 MHz was amplified by two fiber amplifier modules. The pulse train was wavelength shifted in a nonlinear fiber to a wavelength of 2 μm and amplified in a thulium fiber amplifier. The light was then wavelength shifted in a nonlinear fiber to ~2.5 μm and launched into an arsenic sulfide chalcogenide fiber. The arsenic sulfide chalcogenide fiber was a solid core/clad fiber with a core diameter of 10 μm. The chalcogenide fiber broadened the light by various nonlinear phenomena to a bandwidth between 1.5 and 5.5 μm. FIG. 1 shows a schematic of this demonstration. FIG. 2 shows the spectrum of the generated supercontinuum.

EXAMPLE 1

A thulium doped fiber laser operating with a pulse width of >10 ps was amplified and launched into a nonlinear fiber where the pulse was broken up into <1 ps pulse by modulation instability. The pulses were amplified and launched into a nonlinear fiber that Raman shifted the pulses to 2.5 μm. The pulses were launched into a solid core clad As—S fiber where a supercontinuum was generated from 1.5 to >5 μm through a combination of Raman conversion and self phase modulation.

EXAMPLE 2

The system described in Example 1 where the thulium fiber lasers pulses were shifted to ~2.8 μm in a nonlinear fiber and amplified by an amplifier. The amplifier can be an Er:ZBLAN fiber amplifier, fiber Raman amplifier, semiconductor amplifier or nonlinear crystal parametric amplifier. The pulses are launched into a solid core clad As—S fiber where a supercontinuum is generated from ~1.5 to >5 μm through a combination of Raman conversion and self phase modulation.

EXAMPLE 3

The system described in Example 1 where the pulses were launched into a As—S photonic crystal fiber where the fiber dispersion was such that the pump pulses were in the anomalous dispersion region of the fiber. A supercontinuum is generated by a combination of four wave mixing and soliton self frequency shifts from ~1.5 to >5 μm.

EXAMPLE 4

The system described in Example 1 where a portion of the output supercontinuum from the As—S fiber is amplified and launched into an As—Se fiber. A supercontinuum is generated from ~1.5 to >10 μm.

EXAMPLE 5

The systems described in Examples 1 to 5; however, the source of the short pulses within the 2.0 to 2.8 μm wavelength range could be mode locked quantum cascade laser, solid state laser, or OPO laser system. Here, the requirements were pulses of <100 ps and wavelength of 2.0 to 5.0 μm.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A broadband light source, comprising:
   a short pulse laser that generates a signal;
   one or more fiber amplifier modules that amplify the signal one or more times;
   one or more non-amplifying nonlinear fibers that wavelength shift the amplified signal one or more times; and
   a chalcogenide fiber wherein the wavelength shifted signal is pumped in the normal dispersion region of said chalcogenide fiber, and said chalcogenide fiber is broadened to generate a supercontinuum from 1.5 to greater than 5 μm.

2. The broadband light source of claim 1, wherein said signal is from 1 to 2 μm.

3. The broadband light source of claim 1, wherein said signal has a wavelength of 2.4 μm or greater after amplification and shifting in nonlinear fiber.

4. The broadband light source of claim 3, wherein said signal having a wavelength of 2.4 μm or greater is further amplified.

5. The broadband light source of claim 1, wherein the one or more nonlinear fibers comprise silica, fluoride, tellurite, germinate, phosphate, chalcogenide glass, or any combination thereof.

6. The broadband light source of claim 1, wherein amplification is done by fiber amplifiers, semiconductor optical amplifiers, bulk nonlinear crystal optical parametric amplifiers, or any combination thereof.

7. The broadband light source of claim 1, wherein said chalcogenide fiber is a step index, graded index, or microstructured fiber.

8. The broadband light source of claim 1, wherein said chalcogenide fiber is arsenic sulfide or arsenic selenide.

9. The broadband light source of claim 1, wherein a broadband spectrum from said chalcogenide fiber is amplified and injected into a second chalcogenide fiber to generate a longer wavelength broadband spectrum.

10. The broadband light source of claim 9, wherein amplification is done by a chalcogenide fiber Raman or a rare earth doped amplifier, a semiconductor optical amplifier, or a bulk nonlinear crystal optical parametric amplifier.

11. A method for generating a supercontinuum in a chalcogenide fiber, comprising:
 amplifying a signal from a short pulse laser one or more times;
 wavelength shifting the amplified signal in one or more non-amplifying nonlinear fibers one or more times; and
 pumping said signal into a chalcogenide fiber in the normal dispersion region of said chalcogenide fiber to generate a supercontinuum from 1.5 to greater than 5 µm.

12. The method of claim 11, wherein said signal is from 1 to 2 µm.

13. The method of claim 11, wherein said signal has a wavelength of 2.4 µm or greater after amplification and shifting in nonlinear fiber.

14. The method of claim 13, wherein said signal having a wavelength of 2.4 µm or greater is further amplified.

15. The method of claim 11, wherein the one or more nonlinear fibers comprise silica, fluoride, tellurite, germinate, phosphate, chalcogenide glass, or any combination thereof.

16. The method of claim 11, wherein amplification is done by fiber amplifiers, semiconductor optical amplifiers, bulk nonlinear crystal optical parametric amplifiers, or any combination thereof.

17. The method of claim 11, wherein said chalcogenide fiber is a step index, graded index, or microstructured fiber.

18. The method of claim 11, wherein said chalcogenide fiber is arsenic sulfide or arsenic selenide.

19. The method of claim 11, wherein a broadband spectrum from said chalcogenide fiber is amplified and injected into a second chalcogenide fiber to generate a longer wavelength broadband spectrum.

20. The method of claim 11, wherein amplification is done by a chalcogenide fiber Raman or a rare earth doped amplifier, a semiconductor optical amplifier, or a bulk nonlinear crystal optical parametric amplifier.

\* \* \* \* \*